United States Patent
Maria et al.

(10) Patent No.: US 10,375,126 B2
(45) Date of Patent: Aug. 6, 2019

(54) METHODS, DEVICES AND COMPUTER READABLE STORAGE DEVICES FOR INTERCEPTING VOIP TRAFFIC FOR ANALYSIS

(71) Applicant: AT&T Mobility II LLC, Atlanta, GA (US)

(72) Inventors: Arturo Maria, Bellevue, WA (US); Thomas J. Routt, Edmonds, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 422 days.

(21) Appl. No.: 14/087,251

(22) Filed: Nov. 22, 2013

(65) Prior Publication Data
US 2015/0146540 A1 May 28, 2015

(51) Int. Cl.
| H04L 29/06 | (2006.01) |
| H04M 3/22 | (2006.01) |
| H04M 7/00 | (2006.01) |
| H04L 12/58 | (2006.01) |

(52) U.S. Cl.
CPC ........ *H04L 65/1076* (2013.01); *H04L 63/306* (2013.01); *H04M 3/2281* (2013.01); *H04M 7/0078* (2013.01); *H04L 51/10* (2013.01); *H04M 7/006* (2013.01)

(58) Field of Classification Search
None
See application file for complete search history.

(56) References Cited

U.S. PATENT DOCUMENTS

| 6,810,426 B2 | 10/2004 | Mysore et al. |
| 7,280,487 B2 | 10/2007 | Goodman et al. |
| 7,519,074 B2 | 4/2009 | Ward et al. |
| 7,570,743 B2 | 8/2009 | Barclay et al. |
| 7,707,037 B2 | 4/2010 | Claudatos et al. |
| 7,805,310 B2 | 9/2010 | Rohwer |
| 7,876,692 B2 | 1/2011 | Rogers |
| 7,899,167 B1 | 3/2011 | Rae |
| 7,903,639 B2 | 3/2011 | Foo et al. |
| 8,027,841 B2 | 9/2011 | Holloway et al. |

(Continued)

FOREIGN PATENT DOCUMENTS

| AU | 2004244647 | 12/2004 |
| CA | 2289348 | 6/2000 |
| CN | 102932567 | 2/2013 |

OTHER PUBLICATIONS

Oran, D. "Requirements for Distributed Control of Automatic Speech Recognition (ASR), Speaker Identification/Speaker Verification (SI/SV), and Text-to-Speech (TTS) Resources", http://tools.ietf.org/html/rfc4313 (Dec. 2005).

(Continued)

*Primary Examiner* — Derrick W Ferris
*Assistant Examiner* — Manuel Rangel
(74) *Attorney, Agent, or Firm* — Hanley, Flight & Zimmerman, LLC

(57) ABSTRACT

VoIP traffic is intercepted for analysis. Packets transmitted from a mobile communication device over a radio access network to a core mobile communications network are intercepted. VoIP packets are detected within the intercepted packets. The detected VoIP packets are stored for analysis, and the intercepted packets are forwarded to a gateway in communication with a packet data network.

11 Claims, 2 Drawing Sheets

(56) References Cited

U.S. PATENT DOCUMENTS

| | | |
|---|---|---|
| 8,064,580 B1 | 11/2011 | Apple et al. |
| 8,401,859 B2 | 3/2013 | Dhawan |
| 8,413,188 B2 | 4/2013 | Walter |
| 8,416,688 B2 | 4/2013 | Morris et al. |
| 8,488,484 B2 | 7/2013 | Gobriel et al. |
| 2006/0002344 A1* | 1/2006 | Ono et al. ............... 370/331 |
| 2007/0280123 A1* | 12/2007 | Atkins ............ H04L 41/142 370/252 |
| 2009/0049469 A1 | 2/2009 | Small et al. |
| 2010/0083364 A1* | 4/2010 | Fernandez Gutierrez ...... 726/13 |
| 2010/0086119 A1* | 4/2010 | De Luca et al. ........ 379/213.01 |
| 2010/0142382 A1* | 6/2010 | Jungck et al. ............... 370/242 |
| 2010/0162288 A1 | 6/2010 | Huffman et al. |
| 2011/0022480 A1* | 1/2011 | Hoblit et al. ................ 705/16 |
| 2011/0141947 A1* | 6/2011 | Li .................. H04M 3/2281 370/259 |
| 2011/0173001 A1* | 7/2011 | Guy et al. ............... 704/246 |
| 2011/0276396 A1 | 11/2011 | Rathod |
| 2012/0003998 A1* | 1/2012 | McGary ................. 455/466 |
| 2012/0163240 A1* | 6/2012 | Gardell ............ H04L 63/306 370/259 |
| 2012/0179784 A1* | 7/2012 | Picconi et al. ............. 709/217 |
| 2012/0269098 A1 | 10/2012 | Somes |
| 2013/0014146 A1 | 1/2013 | Bhatia et al. |
| 2013/0080917 A1* | 3/2013 | Levien .................. H04L 67/36 715/753 |
| 2013/0095815 A1 | 4/2013 | Venkatraman et al. |
| 2013/0171987 A1 | 7/2013 | Sterman et al. |
| 2013/0173524 A1 | 7/2013 | Hueter et al. |
| 2013/0196630 A1* | 8/2013 | Ungvari ............... H04L 63/306 455/411 |
| 2013/0288652 A1* | 10/2013 | Ciriaco .................. G10L 15/00 455/414.1 |
| 2013/0326631 A1* | 12/2013 | Cartmell ............ H04L 63/306 726/26 |
| 2014/0098662 A1* | 4/2014 | Jungck et al. ............... 370/230 |
| 2014/0358516 A1* | 12/2014 | Lin ..................... G06F 17/289 704/2 |
| 2015/0058242 A1* | 2/2015 | Bucciarelli ........ G06Q 50/265 705/325 |

OTHER PUBLICATIONS

Greene et al. "Media Gateway control protocol architecture and requirements", http://tools-jp.mtk.nao.ac.jp/pdf/draft-ietf-megaco-reqs-08.pdf, 38 pp (Apr. 2000).

Wright et al. "Language Identification of Encrypted VoIP Traffic: Alejandro y Roberto or Alice and Bob?", Proceedings 16th USENIX Security Symposium, pp. 43-54 (2007).

\* cited by examiner

METHODS, DEVICES AND COMPUTER READABLE STORAGE DEVICES FOR INTERCEPTING VOIP TRAFFIC FOR ANALYSIS

TECHNICAL FIELD

The present disclosure relates generally to communication and, more particularly, to VoIP packet interception.

BACKGROUND

In Voice-over-Internet-Protocol (VoIP) systems, voice calls originating from user communication devices are packetized as defined by the Internet Protocol (IP) standard and communicated over the Internet for telephone-like communications. Individual VoIP packets may travel over different network paths to reach a final destination where the packets are reassembled in the correct sequence to reconstruct the voice information.

Despite the advantages of VoIP communications, VoIP communications, like other forms of digital communications, pose threats to today's society in terms of terrorism and criminal activities. As VoIP becomes more popular, the threats posed to society by the use of VoIP grows.

There are currently network components that collect data to for a variety of analytical purposes, such as detecting fraud, security violations, network usage, billing and other purposes. However, such network components have not proven effective in monitoring VoIP communications.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a method is provided for intercepting VoIP traffic for analysis. The method comprises intercepting packets transmitted from a mobile communication device over a radio access network to a core mobile communications network and detecting VoIP packets within the intercepted packets. The method further comprises storing the detected VoIP packets for analysis and forwarding the intercepted packets to a gateway in communication with a packet data network.

According to another illustrative embodiment, a device is provided for intercepting VoIP packets for analysis. The device comprises a processor and a memory. The memory contains instructions which, when executed by the processor, cause the processor to perform operations. The operations comprise intercepting packets transmitted from a mobile communication device over a radio access network to a core mobile communication network and detecting VoIP packets within the intercepted packets. The operations further comprise storing the detected VoIP packets for analysis and forwarding the intercepted packets to a gateway in communication with a packet data network.

According to another embodiment, a computer readable storage device includes instructions which, when executed by a processor, cause the processor to perform operations for intercepting VoIP packets for analysis. The operations comprise intercepting packets transmitted from a mobile communication device over a radio access network to a core mobile communication network and detecting VoIP packets within the intercepted packets. The operations further comprise storing the detected VoIP packets for analysis and forwarding the intercepted packets to a gateway in communication with a packet data network.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to illustrative embodiments, a device for intercepting VoIP packets for analysis, referred to herein as a Mobile Voice Analytics Engine (MVAE), is provided as a front-end processor to a packet data network gateway. The MVAE intercepts data traffic from a mobile communication device before the traffic reaches the packet data network gateway. The MVAE inspects the data traffic to detect VoIP packets. Detected VoIP packets are stored for analysis by the MVAE, and the MVAE forwards the intercepted traffic to the packet data network gateway.

Figure 1:
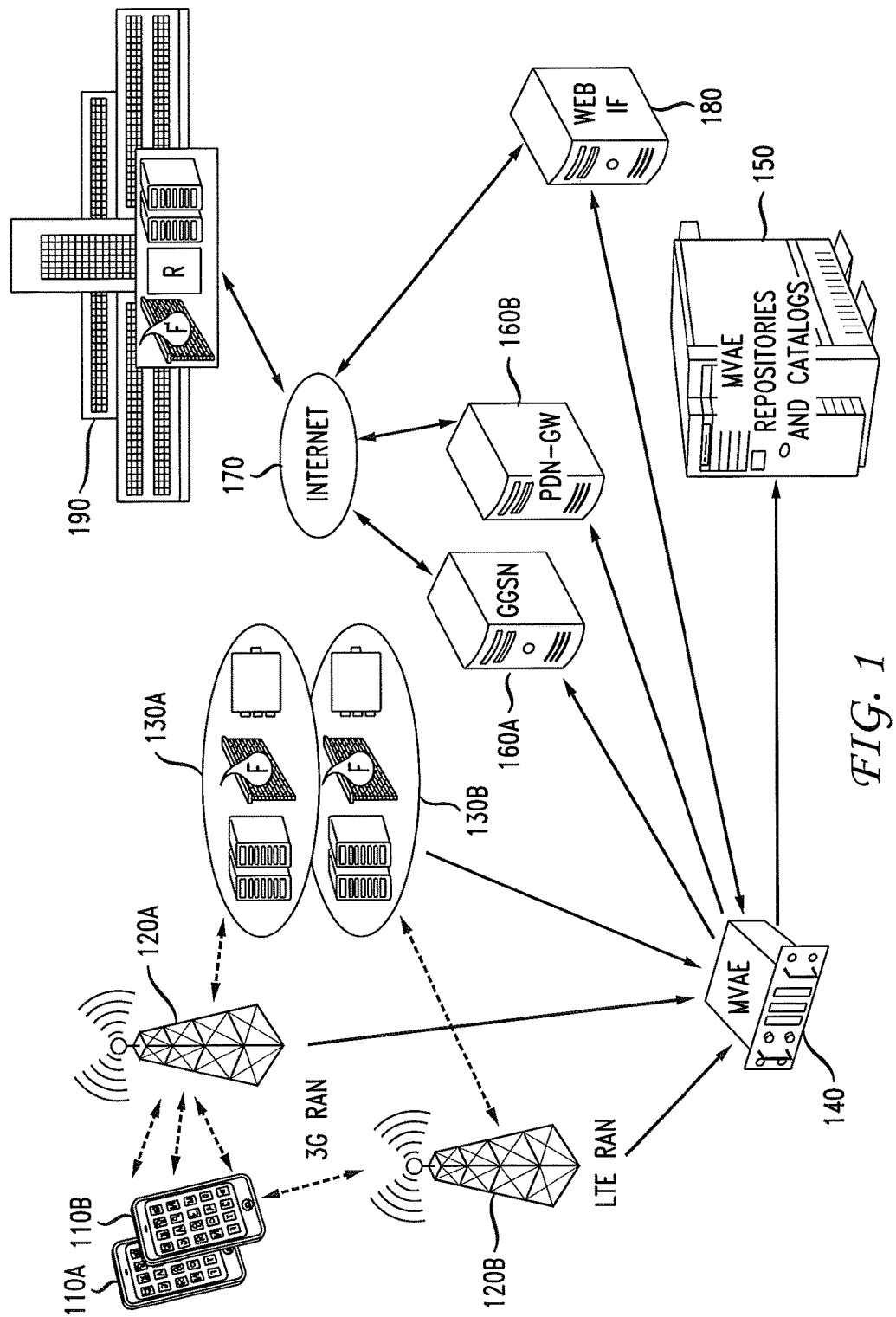
FIG. 1 illustrates an environment in which a mobile voice analytics engine may be implemented according to an illustrative embodiment.

FIG. 1 illustrates an environment in which a MVAE may be implemented according to an illustrative embodiment. As shown in FIG. 1, a MVAE 140 may be implemented outside of core mobility networks 130A and 130B, acting as front-end processor to the gateways 160A and 160B. The MVAE 140 has little or no core mobility network presence. From the perspective of the core mobility networks 130A and 130B, the MVAE appears to be part of the gateways 160A and 160B.

The core mobility networks 130A and 130B receive packets transmitted from the mobile communication devices 110A and 110B via the Radio Access Networks (RANs) 120A and 120B, respectively. The MVAE 140 intercepts data packets transmitted from the mobile communication devices 110A and 110B. The data packets may be intercepted after they are received and transmitted from the RANs 120A and 120B and/or after they are received and transmitted from the core mobility networks 130A and 130B.

According to illustrative embodiments, the RAN 120A is a 3G RAN, and the RAN 120B is a Long Term Evolution (LTE) RAN. Although not illustrated in detail, those skilled in the art will understand and appreciated that the 3G RAN 120A may include, e.g., a NodeB which receives and transmits radio signals from the mobile communication devices 110A and 110B via radio interfaces. The NodeB may include one or more transceivers for transmission and reception of data packets, across the radio interfaces to and from the communication devices 110A and 110B. The RAN 120A may also include a radio network controller (RNC) which allocates radio resources to the mobile communication devices 110A and 110B, administers frequencies, and control handovers between Node Bs. Similarly, the LTE RAN 120B may include an enhanced NodeB (eNodeB) which receives and transmits radio signals from the mobile communication devices 110A and 110B via radio interfaces. The eNodeB may include one or more transceivers for transmission and reception of data packets, across the radio interfaces to and from the communication devices 110A and 110B. The eNodeB also performs control functionalities similar to those of an RNC.

The core mobility networks 130A and 130B shown in FIG. 1 are 3G and LTE networks, respectively. Although not illustrated in detail, those skilled in the art will understand and appreciate that the core mobility networks 130A and 130B include various components for facilitating communication between the mobile communication devices 110A and 110B and a packet data network, such as the Internet 170, via the RANs 120A and 120B and the gateways 160A and 160B, respectively.

For example, the 3G core mobility network 130A may include a Serving General Packet Radio Service Support Node (SGSN) that is in communication with the RAN 120A. The SGSN authenticates the communication devices 110A and 110B by interacting with a Home Subscriber Server (HSS) which is also part of the 3G core mobility network 130A. The HSS may include a Home Location Register (HLR) that maintains subscriber data and an Authentication Center (AuC) that authenticates the mobile communication devices 110A and 110B. The SGSN in turn, is in communication with a Gateway GPRS Support Node (GGSN) 160A. Data packets received from authenticated mobile communication devices are routed towards the GGSN 160A via the SGSN. The GGSN 160A provides connectivity from the mobile communication devices 110A and 110B to external packet data networks, such as the Internet 170.

Similarly, the LTE core mobility network 130B may include a Mobile Management Entity (MME) which is in communication with the RAN 120B. The MME authenticates the communication devices 110A and 110B by interacting with a HSS, which is also part of the LTE core mobility network 130B. The LTE core mobility network 130B may also include a Serving Gateway (SGW) with which the MME communicates to indicate whether a mobile communication device is authenticated. If the communication devices 110A and 110B are authenticated, the SGW routes data packets towards the packet data network gateway (PDN-GW) 160A. The PDN-GW 160A provides connectivity from the mobile communication devices 110A and 110B to external packet data networks, such as the Internet 170.

Further, although not illustrated, it should be appreciated that the core mobility networks 130A and 130B may include additional components, e.g., servers and databases, for providing various network services, such as location services, presence services, emergency services, multimedia messaging services (MMS), short message services (SMS), billing, etc. Some of these components, e.g., the MMS server and the SMS server, may also be provided outside of the core mobility networks 130A and 130B.

Although the core mobility networks 130A and 130B described above are a 3G network and a LTE network, respectively, the concepts described herein may be applicable to any communication network capable of transmitting and receiving VoIP traffic. Such networks may be implemented using wireless networks that use any existing or yet to be developed telecommunications technology.

For example, some other suitable cellular telecommunications technologies include, but are not limited to, Global System for Mobile communications (GSM), Universal Mobile Telecommunications System (UMTS), Time Division Multiple Access (TDMA), Frequency Division Multiple Access (FDMA), Wideband Code Division Multiple Access (WCDMA), Orthogonal Frequency Division Multiplexing (OFDM), and various other 2G, 2.5G, 3G, 4G, and greater generation technologies. Examples of suitable data bearers include, but are not limited to, GPRS, Enhanced Data rates for Global Evolution (EDGE), Evolved Packet Switch (EPS) the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers. In addition, other types networks may be used, e.g., Wireless LAN (WLAN), WiFi, etc., either alone or in combination with the cellular networks.

Referring again to FIG. 1, authenticated data traffic from the core mobility networks 130A and 130B is routed to the GGSN 160A and the PDN-GW 160B, respectively. The GGSN 160A and the PDN-GW 160B, in conjunction with the core mobility networks 130A and 130B and the RANs 120A and 120B, allow the mobile communication devices 110A and 110B to exchange packets, including VoIP packets, with other entities via the Internet 170. Such entities may include, for example, other application servers and other mobile communication devices (not shown).

According to illustrative embodiments, before the authenticated traffic from the core mobility networks 130A and 130B reaches the GGSN 160A and the PDN-GW 160B, respectively, the traffic is intercepted by the MVAE 140. According to one embodiment, as described above, the MVAE 140 acts as front-end processor to the GGSN 160A and the PDN-GW 160B. According to another embodiment, the MVAE 140 may be included as a blade of the GGSN 160A and the PDN-GW 160B and/or may be included as software within the GGSN 160A and the PDN-GW 160B. In all of these embodiments, the MVAE 140 inspects the traffic before it is processed by the GGSN 160A and the PDN-GW 160B.

As indicated above, the MVAE 140 has limited or no network presence and thus does not affect network performance. The MVAE 140 inspects the packets flowing from the core mobility networks 130A and 130B (and/or from the RANs 120A and 120B) and detects VoIP packets. This detection may be performed by inspecting a plurality of headers and data associated with a plurality of targeted layers of the Transmission Control Protocol/Internet Protocol (TCP/IP) architecture and protocol stack. The IP headers of the data packets identify the type of data contained in the packets. For example, VoIP traffic can be detected during network ingress/egress inspection based on a plurality of triggers, including but not limited to detection via inspection of the presence of any single instance or combination of instances of any of H.323 protocol, Media Gateway Control Protocol (MGCP), Session Initiation Protocol (SIP), Media Gateway Control (H.248), Real-time Transport Protocol (RTP), Secure RTP (SRTP), Session Description Protocol (SDP), Inter-Asterisk eXchange (IAX), Skype protocol, and Differentiated Services (DiffServ).

Packets that are determined by the MVAE 140 be VoIP packets are inspected and compared against a set of predetermined heuristics and other characteristics stored in an analytics database. These heuristics and characteristics may be stored as patterns against which the VoIP packets are compared. The VoIP packets may be catalogued and stored in a database within the MVAE 140 or in MVAE repositories and catalogs 150 according to the patterns of heuristics and other characteristics which the VoIP packets match. Examples of heuristics patterns include but are not limited to key words (as described further below), key phrases, context changes, pattern changes, etc.

The VoIP packets may also be compressed and summarized before storage. As VoIP packets are compared to patterns and catalogued, trends may emerge. Thus, the MVAE 140 may "learn" about VoIP traffic and may generate alarms indicative of such trends to entities within the core mobility networks 130A and 130B and to entities 190, such as enterprise and government entities. For example, if the MVAE 140 learns of a trend indicative of an impending terrorist attack, e.g., through detection of key phrases within VoIP traffic, the MVAE 140 may send an alarm to the appropriate government entity via the web interface 180 and the Internet 170.

As described above, the MVAE 140 may compare the VoIP packets to keywords, key phrases, key contexts and/or pattern changes. The contents of the VoIP packets may be compared on a real-time basis against key words, key phrases, key context, and/or pattern changes, and if the content of the VoIP packets matches, the MVAE 140 may trigger alarms. For example, if the contents of the VoIP packets are determined to match keywords, key phrases, key contexts and/or pattern changes indicative of terrorist attacks or other illicit activities, the MVAE 140 may send an alarm to entities 190, such as a government entity, via a web interface 180 and the Internet 170, alerting the entity 190 as to the activity. As another example, if the contents of the VoIP packets are determined to match keywords indicative of an emergency, such as a hurricane or fire, the MVAE 140 may send an alarm to the entity 190 via the web interface 180 and the Internet 170. Also, the MVAE 140 may send an alarm to entities within the core mobility networks 130A and 130B, such as emergency services servers.

The entity 190 may access the MVAE database (included within the MVAE 140 and/or within the MVAE repositories and catalogs 150), proactively and/or in response to an alarm received from the MVAE 140, to analyze the catalogued VoIP traffic. Each catalogued VoIP packet may have an indexing number associated with it, such that it may be easily accessed and analyzed by the enmity 190 via the web interface 180 and the Internet 170. Indexed packets may be retrieved such that an entire VoIP session may be replayed. This may be very useful, for example, in lawful interception and inspection of the VoIP traffic and for analyzing performance of the VoIP network.

In addition to inspecting the headers of the packets from the core mobility networks 130A and 130B (and/or the RANs 120A and 120B), according to another embodiment, the MVAE 140 may also perform deep packet inspection (DPI) of the packets. DPI includes examining the content of the traffic by inspecting the data fields of the packets. According to an illustrative embodiment, the MVAE 140 may perform DPI of pattern-flagged packets, to include VoIP fields and other, non-VoIP fields. DPI may be useful for detecting protocol non-compliance, viruses, spam, intrusions, or other defined criteria to decide whether a packet may pass or if it needs to be trapped or re-routed. If the MVAE 140 determines that the packet should not pass to the GGSN 160A and the PDN-GW 160B, e.g., because the packet contains a virus, the MVAE 140 may trap the packet and store and catalog it as appropriate.

According to another embodiment, the stored VoIP traffic may be used for analyzing network performance and security. Such analysis may be performed by the MVAE 140 or by another entity, e.g., the entity 190. These data can be used correlated with other events in the network, for example, in order to affirm whether intrusions have occurred in the network.

As indicated above, in addition to sending alerts to the entity 190, the MVAE 140 may send alarms to other entities within and outside of the core mobility networks 130A and 130B, such as emergency alert servers. According to one embodiment, the MVAE 140 may convert VoIP packets that are determined to match a particular pattern into SMS and/or MMS messages and send the messages as alerts to SMS and/or MMS servers within the core mobility networks 130A and 130B. The messages may be sent according to the Signaling System (SS7) protocol. The MVAE 140 may also send the converted VoIP packets that match particular patterns as SMS/MMS messages to SMS/MMS servers outside of the core mobility networks 130A and 130B. This may be useful for alerting a plurality of analytics engines within and outside of the core mobility networks 130A and 130B, where such analytics engines and associated servers require SMS/MMS-formatted input.

Figure 2:
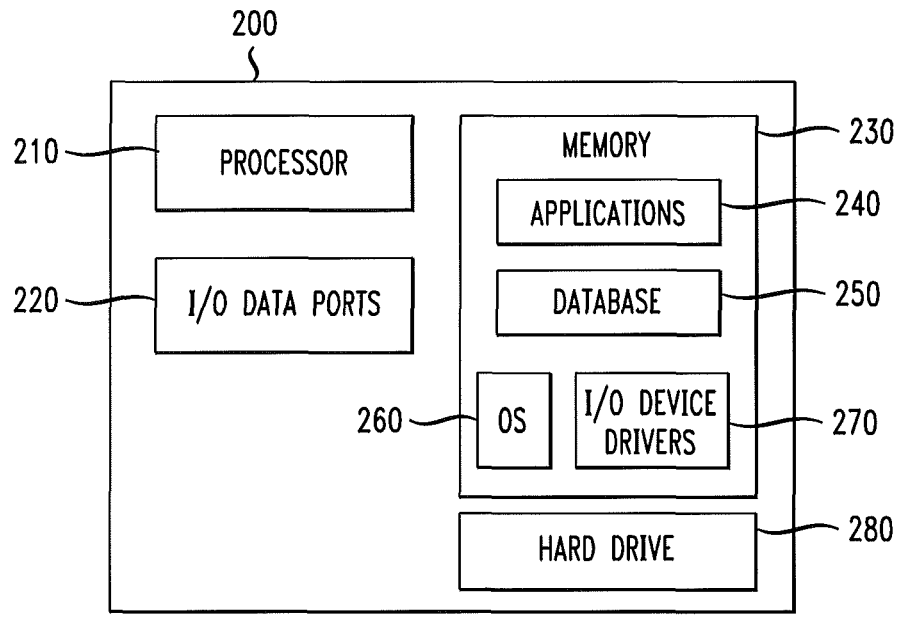
FIG. 2 illustrates a block diagram of a computing device with which a mobile voice analytics engine may be implemented according to illustrative embodiments.

FIG. 2 is a block diagram of a computing device 200 with which the MVAE 140 shown in FIG. 1 may be implemented. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspects of some embodiments of the present disclosure can be implemented. While the description includes a general context of computer-executable instructions, the present disclosure can also be implemented in combination with other program modules and/or as a combination of hardware and software in addition to, or instead of, computer-readable instructions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like. The terminology "computer-readable media" and variants thereof, as used in the specification and claims can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the components shown in FIG. 2, excluding propagating signals.

According to an illustrative embodiment, the computing device 200 may be implemented in any suitable computing device having connections to RANs 120A and 120B, core mobility networks 130A and 130B, packet data network gateways, such as the GGSN 160A and the PDN-GW 160B, and the web interface 180 via any suitable network(s) and network connections. For example, the computing device 200 may be implemented as a component within a server in communication with the RANs 120A and 120B, the core mobility networks 130A and 130B, the GGSN 160A and the PDN-GW 160B, and the web interface 180.

Referring to FIG. 2, the computing device 200 includes a processor 210 that receives data traffic from a communication device, e.g., mobile communication devices 110A and 110B, via RANs 120A and 120B and/or core mobility networks 130A and 130B before the data traffic reaches the gateways 160A and 160B. The data traffic is received via the I/O data ports 220. The processor 210 inspects the intercepted traffic, detects VoIP traffic, and stores the VoIP traffic for analysis. The processor 210 may analyze the VoIP traffic and send alarms via the I/O data ports 220. The processor may also output the VoIP traffic to another entity for analysis and/or storage via the I/O data ports 220. The processor 210 may also receive requests for stored VoIP traffic from, e.g., the entity 190, via the I/O data ports 220. The I/O data ports 220 can be implemented with, e.g., an interface including an antenna or other suitable type of transceiver through which data and signals may be transmitted and received wired and/or wirelessly.

The computing device 200 also includes a physical hard drive 280. The processor 210 communicates with the memory 230 and the hard drive 280 via, e.g., an address/data bus (not shown).

The processor 210 can be any commercially available or custom microprocessor. Additionally, although illustrated and described as one processor, the processor 210 could be implemented with multiple processors, which could include distributed processors or parallel processors in a single machine or multiple machines. Further, it should be appreciated that the processor can be used in supporting a virtual processing environment. Also, the processor could include a state machine, application specific integrated circuit (ASIC), programmable gate array (PGA) including a Field PGA, or a state machine.

The memory is 230 is representative of the overall hierarchy of memory devices containing the software and data used to implement the functionality of the device 200. The memory 230 can include, but is not limited to the types of memory devices described above. As shown in FIG. 2, the memory 230 may include several categories of software and data used in the device 200, including applications 240, a database 250, an operating system (OS) 260, and input/output (I/O) device drivers 270.

The I/O device drivers 270 may include various routines accessed through at least one of the OS 260 by the applications 240 to communicate with devices and certain memory components.

The applications 240 can be stored in the memory 230 and/or in a firmware (not shown) as executable instructions, and can be executed by the processor 210 to perform operations. When the processor 210 executes instructions to perform "operations," this could include the processor performing the operations directly and/or facilitating, directing, or cooperating with another device or component to perform the operations. The applications 240 include various programs that implement the various features of the device 200. For example, the applications 240 may include applications for intercepting data packets, detecting VoIP packets within the intercepted data packets, comparing the detected packets with patterns, performing deep packet inspection, sending alarms, etc.

The database 250 represents the static and dynamic data used by the applications 240, the OS 260, the I/O device drivers 270 and other software programs that may reside in the memory. The database may 250 may be used to store, e.g., heuristic patterns, characteristic patterns and keywords with which detected VoIP packets are compared. Also, the database may be used to store VoIP packets, catalogued according to the patterns and keywords they match as described above.

While the memory 230 is illustrated as residing proximate the processor 210, it should be understood that at least a portion of the memory 230 can be a remotely accessed storage system, including, for example, another server in communication with the processor 210 via the Internet 170, a remote hard disk drive, a removable storage medium, combinations thereof, and the like. Thus, any of the data, applications, and/or software described above can be stored within the memory 230 and/or accessed via network connections to other data processing systems (not shown) that may include a local area network (LAN), a metropolitan area network (MAN), or a wide area network (WAN), for example.

Figure 3:
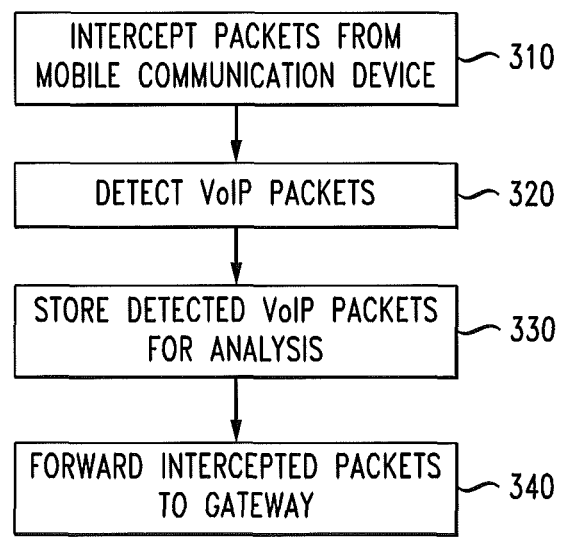
FIG. 3 illustrates a method for intercepting VoIP packets for analysis according to illustrative embodiments.

FIG. 3 illustrates a method for intercepting VoIP traffic for analysis according to illustrative embodiments. It should be understood that the steps or other interactions of the illustrated methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 3, the method begins at step 310 at which packets transmitted from a mobile communication device, such as the mobile communication devices 110A and 110B, are intercepted by the MVAE 140. The packets may be intercepted after they are received from the mobile communication devices and transmitted from the RANs 120A and 120B and/or the core mobility networks 130A and 130B. At step 320, the intercepted packets are inspected by the MVAE 140 to detect VoIP packets. At step 330, detected VoIP packets are stored by the MVAE 140 for analysis. The stored VoIP packets may be catalogued by the MVAE 140 and may be analyzed by the MVAE 140 and/or other entities, as described above. Also, the MVAE 140 may forward the stored packets to MVAE repositories and catalogs 150 as described above. At step 340, the MVAE 140 forwards the intercepted packets to the gateways 160A and 160B which, in turn, transmit the packets to other entities via the Internet 170.

According to exemplary embodiments, the concepts described herein have several advantages. Because the MVAE 140 has limited or no network presence, it may act as a stealth VoIP collection and inspection network resource. Also, the MVAE 140 intercepts, inspects, and stores the VoIP traffic at a single point of presence outside of the core mobility networks 130A and 130B, such that the VoIP traffic is quickly is easily accessible. VoIP traffic intercepted in this manner may be easily correlated with other traffic that traverses the network, such as data. In addition, because analysis of the VoIP traffic does not occur within the network and may occur after the VoIP traffic is intercepted and inspected, maximum throughput for all traffic types is preserved. Yet another advantage of having VoIP traffic intercepted and inspected outside of the core mobility networks 130A and 130B, before the traffic reaches the gateways 160A and 160B, is that the VoIP traffic may be trapped before it reaches the gateways 160A and 160B and the Internet 170, to prevent terrorist acts or other illicit activities that may occur if the VoIP traffic were allowed to pass through.

The law does not require and it is economically prohibitive to illustrate and teach every possible embodiment of the present claims. Hence, the above-described embodiments are merely illustrative illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   intercepting, by executing an instruction with a processor outside a core mobile communications network and not included in a packet data network, packets transmitted from a mobile communication device over a radio access network towards the core mobile communications network and the packet data network, the packets intercepted at an output of the radio access network;
   detecting, by executing an instruction with the processor outside the core mobile communications network, voice over internet protocol packets within the intercepted packets;
   storing the detected voice over internet protocol packets for analysis;
   comparing, by executing an instruction with the processor outside the core mobile communications network, the detected voice over internet protocol packets with a pattern;
   determining, by executing an instruction with the processor outside the core mobile communications network, whether the detected voice over internet protocol packets match the pattern based on the comparing;
   in response to determining that the detected voice over internet protocol packets match the pattern:
      converting, by executing an instruction with the processor outside the core mobile communications network, the detected voice over internet protocol packets into a multimedia message service message as a first alert indicating that the detected voice over internet protocol packets match the pattern;
      sending, by executing an instruction with the processor outside the core mobile communications network, the multimedia service message to a multimedia service message gateway; and
      converting the detected voice over internet protocol packets into a short message service message as a second alert, the second alert to be transmitted to a short message service gateway; and
   forwarding, by executing an instruction with the processor outside the core mobile communications network, the intercepted packets to the gateway of the packet data network to send the intercepted packets towards a destination identified in the voice over internet protocol packets.

2. The method of claim 1, further including sending the detected voice over internet protocol packets to another entity for comparison with a pattern, wherein the other entity determines whether the detected voice over internet protocol packets match the pattern.

3. The method of claim 1, wherein the detecting of the voice over internet protocol packets includes inspecting headers of the intercepted packets.

4. The method of claim 1, further including inspecting the intercepted packets for context.

5. The method of claim 1, further including:
   inspecting data fields of the intercepted packets; and
   preventing the intercepted packets from being forwarded to the gateway of the packet data network based on results of the inspection.

6. A device, comprising:
   a processor outside a core mobile communications network and not included in a packet data network; and
   memory including instructions which, when executed by the processor, cause the processor to perform operations including:
      intercepting packets transmitted from a mobile communication device over a radio access network towards the core mobile communication network, the packets intercepted at an output of the radio access network;
      detecting voice over internet protocol packets within the intercepted packets;
      storing the detected voice over internet protocol packets for analysis;
      comparing the detected voice over internet protocol packets with a pattern;
      determining whether the detected voice over internet protocol packets match the pattern based on the comparing;
      in response to determining that the detected voice over internet protocol packets match the pattern:
         converting the detected voice over internet protocol packets into a multimedia message service message to be sent as a first alert indicating that the detected voice over internet protocol packets match the pattern; and
         sending the multimedia service message to a multimedia service message gateway; and
         converting the detected voice over internet protocol packets into a short message service message to be sent as a second alert; and
      forwarding the intercepted packets to the gateway of the packet data network to send the intercepted packets towards a destination identified in the voice over internet protocol packets.

7. The device of claim 6, wherein the detecting of the voice over internet protocol packets includes inspecting headers of the intercepted packets.

8. The device of claim 6, wherein the instructions, when executed by the processor, further cause the processor to inspect the intercepted packets for context.

9. A computer readable storage device comprising instructions that, when executed, cause a processor outside a core mobile communications network and not included in a packet data network to perform operations including:
   intercepting packets transmitted from a mobile communication device over a radio access network towards the core mobile communication network, the packets intercepted at an output of the radio access network;
   detecting voice over internet protocol packets within the intercepted packets;
   storing the detected voice over internet protocol packets for analysis;
   comparing the detected voice over internet protocol packets with a pattern;
   determining whether the detected voice over internet protocol packets match the pattern based on the comparing;

in response to the determining that the detected voice over internet protocol packets match the pattern:
  converting the detected voice over internet protocol packets into a multimedia message service message to be sent as a first alert indicating that the detected voice over internet protocol packets match the pattern; and
  sending the multimedia service message to a multimedia service message gateway; and
  converting the detected voice over internet protocol packets into a short message service message to be sent as a second alert; and
forwarding the intercepted packets of the gateway to the packet data network to send the intercepted packets towards a destination identified in the voice over internet protocol packets.

10. The computer readable storage device of claim 9, wherein the detecting of the voice over internet protocol packets includes inspecting headers of the intercepted packets.

11. The computer readable storage device of claim 9, wherein the instructions, when executed by the processor, further cause the processor to inspect the intercepted packets for context.

* * * * *